W. S. GREEN.
LIFE-SAVING APPARATUS.

No. 195,002. Patented Sept. 11, 1877.

WITNESSES:
INVENTOR:
W. S. Green.
BY
ATTORNEYS.

UNITED STATES PATENT OFFICE.

WALTER S. GREEN, OF LONG BRANCH, NEW JERSEY.

IMPROVEMENT IN LIFE-SAVING APPARATUS.

Specification forming part of Letters Patent No. 195,002, dated September 11, 1877; application filed July 23, 1877.

*To all whom it may concern:*

Figure 1:
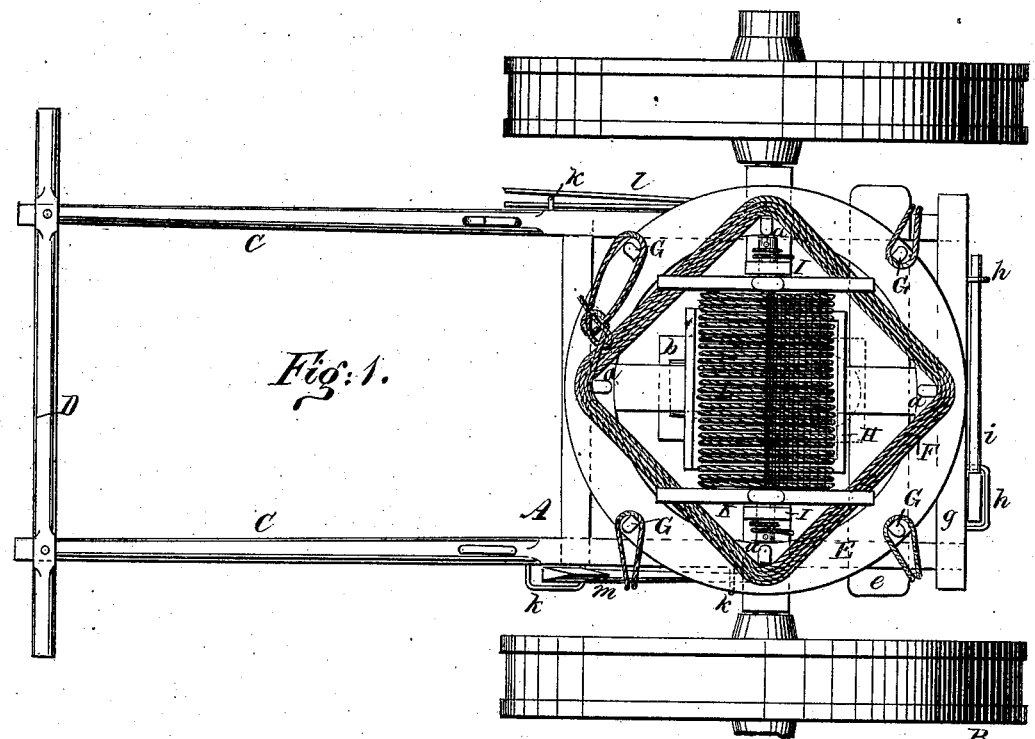
Figure 2:
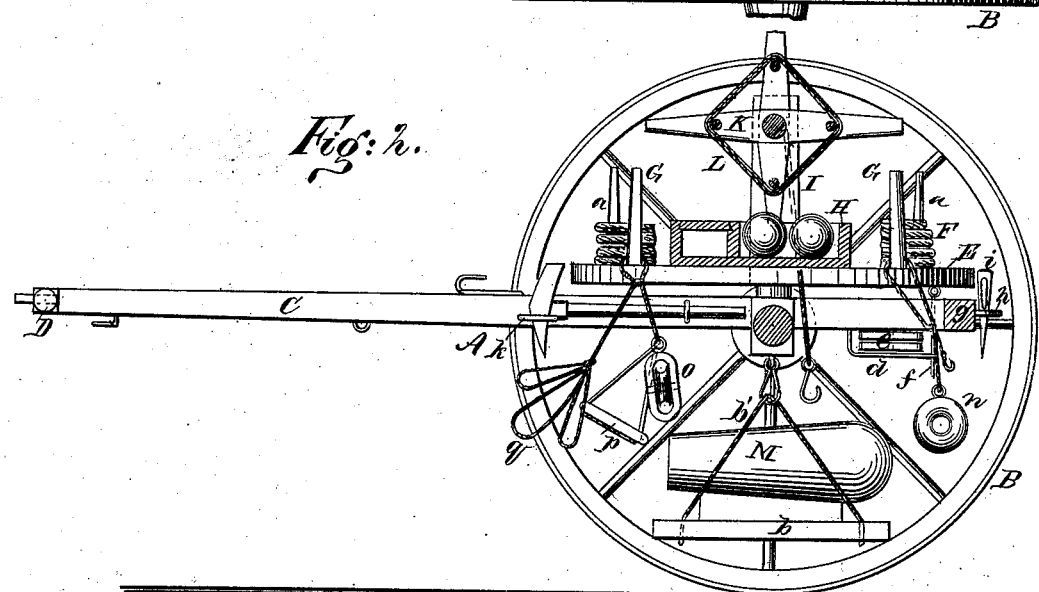

Be it known that I, WALTER S. GREEN, of Long Branch, in the county of Monmouth and State of New Jersey, have invented a new and Improved Life-Saving Apparatus, of which the following is a specification:

Figure 1 is a plan view. Fig. 2 is a side elevation.

My invention relates to apparatus for rescuing persons from wrecks of vessels and other inaccessible places; and it consists of a cart on which are mounted two reels, one for carrying a hawser and the other for carrying a line.

The said cart is also equipped with a mortar, and other appliances, hereinafter more fully described.

Referring to the drawing, A is a cart, having wheels B of wide tread, and provided with shafts C, which are connected at their outer ends by a cross-bar, D.

Upon the axle of the cart a wheel, E, is pivoted, so that it rotates in a horizontal plane. Stakes $a$ project vertically from the said wheel, forming a reel upon which the hawser F is wound.

Near the periphery of the wheel E there are stakes G for receiving the various attachments used in connection with the hawser.

Upon the center of the wheel E a box, H, is secured for carrying balls, powder, fuse, &c., and from two of the arms of the said wheel standards I project vertically. In these standards a reel, K, is journaled, upon which a light line, L, is wound. This reel is provided with arms, by which it is turned, and its shaft projects at each end beyond the standards I, forming a windlass for raising the mortar M when it is suspended from the axle.

The mortar M is of the usual description, being cast in a single piece with the plate $b$, to which it is attached, and provided with slings $b'$, by which it is suspended from snap-hooks $c$ on the axle.

Under the rearwardly-projecting ends of the shafts C there are arms $d$ for receiving the sand-anchors $e$, the latter being held in place by pins $f$.

From the rear cross-bar $g$ that connects the shafts, staples $h$ project for receiving an ax, $i$, and staples $k$ project from the shafts for receiving upon one side of the cart shear-poles $l$, and upon the other a pick-ax, $m$.

The cart carries a dead-eye, $n$, to be used in connection with the sand-anchors, and also a pulley-block, $o$, which is connected with a boatswain's chair, $p$, to which the treble loop-knot $q$ is also attached, for receiving the body and arms of a person incapable of clinging to the chair $p$.

The cart is also provided with a pair of pulley-blocks for drawing up the hawser.

The uses of the various devices carried by the cart are obvious.

The mortar and balls are used for carrying the smaller line to the vessel. The smaller line is used for hauling the hawser to the vessel, the sand-anchors are buried in the sand, and to them the shore end of the hawser is attached.

The shear-poles are designed for holding the hawser up out of the water, and the boatswain's chair runs upon the hawser from the vessel to the shore, being hauled by the small line.

The ax and pick-ax are for removing ice, and for other purposes.

The cart is designed to be drawn by men; but by removing the cross-bar D a horse may be hitched between the shafts.

Having thus described my invention, I claim as new and desire to secure by Letters Patent—

1. The combination of a horizontal wheel, E, provided with stakes $a$ G and ammunition-box H, with the cart A, substantially as shown and described.

2. The reel K, having a shaft with projecting ends mounted upon the wheel E, as and for the purpose herein set forth.

3. The slings $b'$, in combination with the mortar M, substantially as shown and described.

4. The combination, in life-saving apparatus, of the cart A, wheel G, reel K, and ammunition-box H, substantially as shown and described.

WALTER SCOTT GREEN.

Witnesses:
JOHN E. LANNING,
WILLIAM I. CHAMBERLAIN,
JOHN A. MORFORD.